United States Patent [19]

Dimanshteyn

[11] Patent Number: 4,871,477
[45] Date of Patent: Oct. 3, 1989

[54] FIRE PROTECTED FOAMED POLYMERIC MATERIALS

[75] Inventor: Felix Dimanshteyn, West Hartford, Conn.

[73] Assignee: Firestop Chemical Corporation, Chicopee, Mass.

[21] Appl. No.: 260,400

[22] Filed: Oct. 20, 1988

Related U.S. Application Data

[63] Continuation-in-part of Ser. No. 230,054, Aug. 9, 1988, abandoned, which is a continuation-in-part of Ser. No. 88,832, Aug. 24, 1987, abandoned, which is a continuation-in-part of Ser. No. 891,202, Jul. 28, 1986, abandoned, which is a continuation-in-part of Ser. No. 608,728, May 10, 1984, Pat. No. 4,612,239, which is a continuation-in-part of Ser. No. 466,375, Feb. 15, 1983, abandoned.

[51] Int. Cl.$^4$ .................. C09K 21/00; C09D 5/16; C09D 5/18
[52] U.S. Cl. .................. 252/609; 106/18.12; 106/18.13; 106/18.16; 106/18.24; 106/18.3; 106/18.31; 106/18.32; 106/18.33; 252/601; 252/606; 252/7; 428/402.24; 428/403; 428/404; 428/406; 428/920; 428/921; 521/903; 521/906; 521/907
[58] Field of Search .................. 252/2, 4, 5, 6, 7, 606, 252/608, 43, DIG. 2, 609, 610; 8/490; 521/906, 907; 156/325, 326, 327, 333, 334; 428/920–921, 251–252, 246, 284, 285, 287, 408, 902

[56] References Cited

U.S. PATENT DOCUMENTS

| | | | |
|---|---|---|---|
| 1,271,506 | 7/1918 | Ferguson . | |
| 3,262,964 | 7/1966 | Rust et al. | 260/465.7 |
| 3,317,433 | 5/1967 | Eichel | 252/316 |
| 3,639,299 | 2/1972 | MacDowall | 260/2.5 FP |
| 3,639,304 | 7/1972 | Raley | 161/403 |
| 3,677,999 | 7/1972 | Denk et al. | 260/38 |
| 3,686,067 | 8/1972 | Williams | 161/160 |
| 3,699,041 | 10/1972 | Sanderford | 252/8.1 |
| 3,714,047 | 1/1973 | Marion et al. | 252/62 |
| 3,717,597 | 2/1973 | Hesskamp et al. | 260/2.5 AJ |
| 3,719,614 | 3/1973 | Wright | 260/2.5 L |
| 3,737,400 | 6/1973 | Kumasaka et al. | 260/2.5 AJ |
| 3,763,057 | 10/1973 | Diehr et al. | 260/2.5 AW |
| 3,772,220 | 11/1973 | Parker et al. | 260/2.5 L |
| 3,819,543 | 6/1974 | Stastny et al. | 260/2.5 HA |
| 3,854,535 | 12/1974 | Kehr et al. | 169/48 |
| 3,865,760 | 2/1975 | Pitts et al. | 260/2.5 AJ |
| 3,874,889 | 4/1975 | Geppert et al. | 106/288 B |
| 3,909,464 | 9/1975 | Anorga et al. | 260/2.5 AJ |
| 3,960,788 | 6/1976 | Cuscurida et al. | 260/2.5 AW |
| 3,963,849 | 6/1976 | Thompson | 428/182 |
| 3,997,700 | 12/1976 | Jacquemin et al. | 428/332 |
| 4,043,987 | 8/1977 | Jolicoeur et al. | 260/78.41 |
| 4,066,579 | 1/1978 | Yukuta et al. | 260/2.5 AP |
| 4,089,912 | 5/1978 | Levek et al. | 260/862 |
| 4,097,400 | 6/1978 | Wortmann et al. | 252/182 |
| 4,150,207 | 7/1979 | Cenker et al. | 521/174 |
| 4,163,005 | 7/1979 | Albright | 260/45.7 S |
| 4,182,799 | 1/1980 | Rodish | 521/96 |
| 4,190,696 | 2/1980 | Hart et al. | 428/306 |
| 4,190,698 | 2/1980 | DeBoel et al. | 428/334 |
| 4,196,268 | 4/1980 | Brown et al. | 521/130 |
| 4,212,953 | 7/1980 | Sheratte et al. | 521/137 |
| 4,216,130 | 8/1980 | Rigge et al. | 260/29.7 R |
| 4,220,729 | 9/1980 | Uchida et al. | 521/124 |
| 4,221,874 | 9/1980 | Moedritzer | 521/108 |
| 4,221,875 | 9/1980 | Yukuta et al. | 521/128 |
| 4,224,374 | 9/1980 | Priest | 428/310 |
| 4,232,085 | 11/1980 | Carlstrom et al. | 428/315 |
| 4,234,693 | 11/1980 | Wooler | 521/107 |
| 4,237,182 | 12/1980 | Fulmer et al. | 428/310 |
| 4,246,359 | 1/1981 | Whelan | 521/92 |
| 4,246,360 | 1/1981 | Brown et al. | 521/102 |
| 4,260,514 | 4/1981 | Foucht | 252/182 |
| 4,273,881 | 6/1981 | Otten | 521/108 |
| 4,277,569 | 7/1981 | Walker | 521/92 |
| 4,315,075 | 2/1982 | Gardner | 521/71 |
| 4,315,082 | 2/1982 | Beacham et al. | 525/20 |
| 4,317,889 | 3/1982 | Pcolinsky | 521/107 |
| 4,349,494 | 9/1982 | Fulmer | 264/45.3 |
| 4,376,833 | 3/1983 | Ferretti | 521/122 |
| 4,390,642 | 6/1983 | Smith | 521/112 |

(List continued on next page.)

OTHER PUBLICATIONS

"Alumina Trihydrate as a Flame-Retardant For Polyurethane Foams", Bonsignore, J. Cell Plastics, 07–08/82.

"Self-Extinguishing Characteristics of Flame Resistant Flexible Urethan Foam", Pruitt, J. Cell Plastics, 11–12/70.

"Flame Retardant Flexible Polyurethane Foam by Post-Treatment with Alumina . . . ", Bonsignore, 05–06/79.

"Flammability Handbood for Plastics", Hilado, Technomic Publishing Co., 1982.

"Improved Furniture and Mattress Fire Safety Through Use of . . . ", Schuhmann.

(List continued on next page.)

Primary Examiner—Howard J. Locker
Attorney, Agent, or Firm—Lahive & Cockfield

[57] ABSTRACT

Disclosed are foam polymer compositions having outstanding resistance to expose to flame. The compositions comprise the product of reaction of a foamable composition and certain inorganic filler materials including one or more of (A) microexplodable micron-sized particles having an internal phase of a non-flammable gas releasing inorganic particulate material such as alumina trihydrate and an external phase of fusible inorganic material such as sodium silicate, (B) particulate, expandable alkali metal silicate, and (C) a particulate inorganic fire retardant such as ammonium salt of a phosphate or polyphosphate. The foams are self-extinguishing, essentially non dripping, and generate only low levels of smoke when impacted directly with the flame of a blowtorch.

19 Claims, No Drawings

U.S. PATENT DOCUMENTS

| | | | |
|---|---|---|---|
| 4,396,661 | 8/1983 | George et al. | 428/90 |
| 4,404,297 | 9/1983 | Fishler et al. | 523/179 |
| 4,407,981 | 10/1983 | Aaronson | 521/107 |
| 4,428,999 | 1/1984 | George et al. | 428/246 |
| 4,438,028 | 3/1984 | Schmittmann et al. | 252/609 |
| 4,451,586 | 5/1984 | Searl et al. | 521/88 |
| 4,463,106 | 7/1984 | Ruhl et al. | 521/103 |
| 4,467,056 | 8/1984 | Staendeke et al. | 523/208 |
| 4,468,841 | 8/1984 | Barda et al. | 521/171 |
| 4,504,603 | 3/1985 | Hicks | 521/85 |
| 4,514,328 | 4/1985 | Staendeke et al. | 252/609 |
| 4,521,333 | 6/1985 | Graham et al. | 252/606 |
| 4,521,543 | 6/1985 | Ruhl et al. | 521/103 |
| 4,525,490 | 6/1985 | Smith | 521/124 |
| 4,532,261 | 7/1985 | Ruhl et al. | 521/103 |
| 4,542,164 | 9/1985 | Nishioka et al. | 521/135 |
| 4,542,170 | 9/1985 | Hall et al. | 523/179 |
| 4,546,117 | 10/1985 | Szabat | 521/107 |
| 4,587,273 | 5/1986 | Shimomura | 521/107 |
| 4,603,078 | 7/1986 | Zanker et al. | 428/317.9 |
| 4,612,239 | 9/1986 | Dimanshteyn | 428/246 |
| 4,623,672 | 11/1986 | Kleinstuck et al. | 521/108 |
| 4,695,597 | 9/1987 | Seino | 521/154 |
| 4,698,369 | 10/1987 | Bell | 521/99 |
| 4,699,734 | 10/1987 | Kendall et al. | 252/609 |
| 4,717,509 | 1/1988 | Buttgens et al. | 252/609 |
| 4,722,945 | 2/1988 | Wood et al. | 521/65 |
| 4,740,527 | 4/1988 | von Bonin | 521/105 |

OTHER PUBLICATIONS

"Fire and Cellular Polymers", Buist et al., Elsevier Applied Science N.Y., 1986, pp. 279-313.

"Handbook of Plastics Flammability and Combustion Toxicology", Landrock, NDYES Publication 1983, N.J., pp. 23-30.

"Alumina Hydrate as a Flame-Retardant Filler for Thermoplastics", Sobolev et al., 31st SPE ANTEC, 1973.

"Comparative Evaluation of Zinc Borate 2:3:3.5 with Antimony Oxide . . . ", Bower et al.

American Wood-Preservers' Association Standard A2-86 (1986).

American Wood-Preservers' Association Standard A3-84 (1984).

American Wood-Preservers' Association Standard M20-83 (1983).

FIRE PROTECTED FOAMED POLYMERIC MATERIALS

REFERENCE TO RELATED APPLICATIONS

This application is a continuation-in-part of copending U.S. application Ser. No. 230,054 filed Aug. 9, 1988 (now abandoned), which was a CIP of Ser. No. 07/088832 filed 8/24/87(abandoned), which was a CIP of Ser. No. 06/891202, filed 7/28/86 (abandoned), which was a CIP of Ser. No. 06/608728, filed 5/10/84, (now U.S. Pat. No. 4612239), which was a CIP of Ser. No. 06/466375, filed 2/15/83(abandoned).

BACKGROUND OF THE INVENTION

This invention relates to inorganic particulate fillers useful in the production of substantially fireproof foamed polymeric products and other materials. More particularly, the invention relates to the production of polymeric materials which are self fire-extinguishing, low smoking, and substantially non-dripping, even when exposed directly to a flame for substantial periods of time, and which retain acceptable mechanical properties.

Foamed polymeric materials are produced from a variety of thermoplastic, thermosetting, and other resins using conventional techniques involving expansion of various thermoplastic polymers or formation of polymers in the presence of a blowing agent. Blowing agents serve to produce a multiplicity of open or closed cells within the polymer structure, resulting in expanded, light weight materials having significant and diverse commercial uses. The patent and other literature is replete with methods for producing foamed polymers having various chemical and physical properties. Currently, rigid and flexible foamed plastic materials are available commercially, essentially world-wide, which have various densities and open or closed-cell structures. The foams are fabricated from a great variety of resins or prepolymer mixtures. These materials are used for cushioning, thermal and electrical insulation, and structural applications.

Polyurethane foams are perhaps the most commercially successful as measured on a production volume basis. Generally, polyurethanes are produced by reaction of a polyisocyanate and a polyol, i.e., organic structures having at least two isocyanate or alcohol groups, typically in the presence of a catalyst, and in the presence of a blowing agent. Flexible polyurethane foams are widely used in the production of mattresses, cushions, and other soft-furnishings, protective packaging, carpet underlay, fabric backing, and in automobile and aircraft seats. Polyurethanes also are used to produce rigid structural elements which are inert, thermally insulating, and producible in a variety of useful shapes.

It has long been recognized that foam plastic materials are flammable and present a significant fire hazard. Upon exposure to fire or high temperatures, most foam plastics, because of their cellular structure, high organic content, and large surface area, decompose and burn rapidly emitting abundant smoke and producing flowable, flame supporting drips which serve to spread the fire. Once ignited, foam plastics not specifically designed to be fire resistant are rapidly and completely consumed. Because foam materials often are used in quantity in enclosed living space and in vehicles, the industry has long sought fireproofing methods so as to reduce or eliminate the fire hazard.

A review of the literature suggests three basic approaches. Perhaps least versatile is the technology disclosed, for example, in U.S. Pat. No. 4,349,494, broadly involving the concept of protecting a foam plastic material within a sheath or coating of nonflammable or fire resistant material. A second approach involves chemical engineering of the polymer or monomers from which the foam is made so as to decrease the flammability of the solid phase of the foam structure itself. This approach is exemplified by the many disclosures involving the use of halogenated organic polymers. The third general approach involves mixing fire retardant or fire resistant filler materials within the continuous phase of the foam's structure. Upon exposure to heat above the foam's ignition temperature or to flame, the fillers expell nonflammable gases locally, or form a semi-continuous layer on the surface exposed to the flame, both of which have the effect of limiting oxygen transport to the organic fuel. While the latter two methods both have significant beneficial fire retardant effects, neither approach has heretofore yielded foams which meet the emerging international fire resistance standards for foamed plastics.

For a general discussion for the state of the art of foam plastic fire retardant technology, see, for example, HANDBOOK OF PLASTICS FLAMMABILITY AND COMBUSTION TOXICOLOGY (A. H. Landrock, Noyes Publications, 1983) chapter 4, "Fire Retardants"; *Alumina Trihydrate as a Flame Retardant for Polyurethane Foams*, JOURNAL OF CELLULAR PLASTICS, July/August 1981, page 220; *Alumina Hydrate as a Flame-Retardant Filler for Thermoplastics*, I. Sobolev et al, 31st SPE ANTEC, Montreal, May 7, 1973; *Fire and Cellular Polymers*, J. M. Buist et al, Elsevier Applied Science, 1986; and *Flammability Handbook for Plastics*, third edition, C. J. Hilado, Technomic Publishing Co., 1982, particularly, chapter 5, "Prevention, Inhibition and Extinguishment".

U.S. patents disclosing compositions for inclusion in foamed polymers to impart fire retardant or fire resistant properties include Schmittmann et al, U.S. Pat. Nos. 4,438,028; Hicks, 4,504,603; Priest, 4,224,374; Fulmer et al, 4,237,182; Kumasaka et al, 3,737,400; Brown et al, 4,246,360; Wright, 3,719,614; Wortmann et al, 4,097,400; Rigge et al, 4,216,130; Pcolinsky, Jr., 4,317,889; Szabat, 4,546,117; Rodish, 4,182,799; Otten, 4,273,881; Geppert et al, 3,874,889; Yakuta et al, 4,066,579; Gardner, 4,315,075; Hart et al, 4,190,696; Anorga et al, 3,909,464; and Cenker et al, 4,150,207. These patents disclose various inorganic additives used alone, in combination with each other, or in combination with particular halogen-derivitized polymers, char forming agents, and other substances which decrease foam plastic flammability. However, none of the disclosed formulations are believed to impart adequate fire resistance to foamed polymers.

The chemistry of ignition, fire propagation, and fire retardancy in foamed polymers is extremely complex and generally not well understood. Reducing smoke generation, the tendency of burning foam polymers to drip and run, and the fire propagating properties of foams exposed to flame are goals extremely difficult to obtain in combination, particularly with respect to non-thermoplastic foams such as polyurethanes. The need for such materials has increased as the market expands and the volume of foamed materials used in enclosed spaces increases.

It is an object of this invention to provide compositions of matter useful as fillers in a variety of foamed and unexpanded plastic materials, paints, and other coating compositions which impart to the materials a level of fire resistance heretofore unknown in the art. Another object is to provide filler compositions readily adaptable for use in thermoplastic, thermosetting, and other types of foams which impart fireproofing properties at loading levels resulting in only moderate, acceptable reductions in the foam's mechanical properties. Another object is to produce various types of foamed polymeric materials characterized by relatively low smoke generation, substantially eliminated tendency to drip or flow while burning, and a self-extinguishing property. Another object is to provide flexible and rigid foams which may objectively be characterized as nonburning, that is, unable to sustain or spread fire even when directly exposed to a flame, e.g., from a blow torch. Another object is to provide fireproof rigid and flexible polyurethane foams. Yet another object is to provide inorganic compositions of matter which may be added to foam plastic and other polymeric formulations to reduce the fire hazard they present.

These and other objects and features of the invention will be apparent from the description and claims which follow.

SUMMARY OF THE INVENTION

In one aspect, the invention involves incorporation into what otherwise may be a conventional polymeric foam of uniformly dispersed micron-sized, fire resisting, inorganic particles. The particles comprise one or a mixture of materials which expand when heated because of internal generation of a nonflammable gas.

One preferred material is a water-soluble form of an alkali metal silicate, e.g., sodium silicate, containing within its structure retained water which, upon exposure to flame temperatures, volatilizes and expands the fusible silicate.

The particles also may comprise composite materials having an internal phase and an external phase. The internal phase consists of a compound which at the relatively high temperature of a fire endothermically releases a nonflammable gas such as steam or carbon dioxide. The external phase comprises a compound which has a fusion point above the temperature at which the nonflammable gas is released from the internal phase, and which subsequently forms a vitreous barrier layer. The internal phase compound is dispersed within or preferably partially or completely encapsulated by the external phase. Upon exposure to fire, such composite particles spontaneously expand explosively, i.e., undergo "microexplosions", as the pressure of gas or vapor released from the internal phase fractures the external phase, thereby locally extinguishing the fire and releasing a local microscopic blanket of nonflammable gas.

Subsequently, as additional heat is applied to the foam, the exernal phase, the external phase in combination with the residue of the internal phase, or these in combination with the alkali metal silicate, form a continuous vitreous barrier layer, glass-like in character, which serves to separate the organic polymeric fuel from oxygen, forms a barrier to the release of volatiles from the foam, thermally insulates the organic fuel from the fire, and aids in preventing dripping or sagging of the hot polymer. Furthermore, the release, volatilization, and/or expansion of the released gas absorbs heat, as does fusion of the vitreous layer, thereby locally cooling the area impacted by the fire.

The silicate and two phase particles may be present together in various ratios, or they may be used separately. It is preferred to include both types or particles. The external phase of the two phase particles may comprise, and preferably does comprise, alkali metal silicate. Also, silicate particles may be used in admixture with nonflammable gas releasing materials of the type used to produce the internal phase of the two phase particles, e.g., alumina trihydrate.

Exploitation of this approach can result in the production of foams which, upon exposure to the flame of a blow torch, even when concentrated in one area for several minutes, (1) generate relatively little smoke having a compositions dictated by the nature of the foamed polymer, (2) are self-extinguishing, and (3) have little or no tendency to drip or run.

Preferably, the polymer matrix also includes a conventional fire retardant, preferably an ammonium salt of a phosphate, pyrophosphate, polyphosphate, or sulfate. The combination of such fire retardants together with the fire resistant fillers provide an interactive system, adaptable for use in producing various degrees of fire protection in various types of foam or other polymeric composition. The invention enables manufacture of flexible or rigid foams of various types and densities, including polyurethane foams, having remarkable fire resisting properties, many of which objectively can be characterized as fireproof under fairly severe fire conditions.

Accordingly, in one aspect, the invention provides a fire resistant foamed polymeric material comprising the product of reaction of a mixture of a foamable polymer composition and one or a mixture of expandable inorganic fire resistant materials. The materials may include (a) alkali metal silicate particles containing entrapped water, and (b) particles comprising at least two phases of inorganic materials. The internal phase comprises a solid particulate material which releases a nonflammable gas such as water or carbon dioxide endothermically at high temperatures. Suitable such materials include borax, hydrated borate salts, carbonates and bicarbonates, hydrated metal oxides, preferably alumina trihydrate, and hydrated metal silicates. At least a portion and preferably all of the internal phase particulate material is enveloped by a solid, fracturable, inorganic external phase, e.g., a metal oxide or silicate, having a fusion point above the temperature at which the nonflammable gas is released. Alkali metal silicate particles mixed with (as opposed to encapsulating) nonflammable gas releasing materials also work well in many applications. The foamed polymeric material is characterized as being self fire-extinguishing and substantially non-dripping even when directly exposed to flame.

In preferred embodiments, the fire resisting foamed polymeric material further comprises an inorganic fire retarding particulate material dispersed therewithin such as a phosphate, pyrophosphate, polyphosphate, or sulfate salt, most preferably comprising one or more ammonium cations, with any remaining valence being satisfied by hydrogen or a metal ion. Such fire retardants have been found to coact to produce in combination outstanding low and high temperature fireproofing properties.

The foamed plastic material may comprise a plurality of different inorganic, expandable, nonflammable gas releasing particles characterized by different gas release temperatures whereby the particles microexplode at different temperature upon exposure of the foam to the fire. In this case local fire extinguishing microexplosions occur at progressively higher threshold temperatures.

In another aspect, the invention provides compositions of matter comprising the inorganic ingredients disclosed above for use as a fire resisting additive to foamable and other polymer based compositions. The additive or filler compositions may be used to impart fire resisting properties to unfoamed plastic materials, and organic polymer-based coating compositions such as paints.

The invention may be exploited using a variety of thermosetting, thermoplastic, and other types of foamable compositions. A preferred polymer composition comprises a polyisocyanate and a polyol in relative proportion sufficient upon reaction to produce a polyurethane foam, either flexible or rigid. Diisocyanates comprising aromatic or olefinic moieties may be used. Either the polyol or diisocyanate component of the foamed urethane may be halogenated. Useful thermoplastic polymer compositions include polyvinyl chloride and various polyolefins such as polyethylene, polypropylene, and polybutadiene.

DESCRIPTIONS

The invention provides a combination of fire resisting and fire retarding particulate filler materials constituting a system for use in imparting fire resisting properties to organic polymers. When formulated as disclosed herein, the materials impart self-extinguishing, low smoke, and drip-resisting properties to various polymers, including foam polymers having a high surface area. As used herein, the phrase "fire resistant" refers to materials which act physically to separate the organic polymer fuel from the fire and to cool the fuel; the phrase "fire retardant" refers to materials which chemically interact with the polymer at fire temperatures so as to interfere with the chemistry of polymer oxidation.

The fire resistant materials useful in the invention include alkali metal silicate particles comprising retained water and microexplosive particles of a nature described in detail below. The fire resistant materials may be used individually to achieve many of the objects of the invention, but preferably are used as a mixture. The fire retardant materials are preferably ammonium salts of phosphate, pyrophosphate, polyphosphate, or sulfate. It is not required, but it is very advantageous to use the fire resistant and fire retardant materials in combination. Significant fire resisting properties may be achieved using the microexplosive particles alone, these particles in admixture with alkali metal silicate particles containing retained water, or alkali metal silicate in admixture with particles of the type which can be used as the internal, gas releasing phase of the microexplosives particles.

The microexplosive particles are employed to extinguish and stop the spread of fire point by point within the structure of a foamed plastic or other flammable organic matrix. In addition to the microexplosion effects, the particles provide a localized cooling effect. Cooling occurs as the particles absorb heat used to break chemical bonds of the inorganic particulate material to release the bound, gas-forming moieties and as heat of vaporization is supplied. Fire resistance is also provided by local release of nonflammable gases which temporarily serve to separate the polymeric fuel from oxygen. Lastly, the inorganic particles at the temperatures of fire after microexplosive fracture fuse to present a continuous or semi-continuous glass-like, vitreous barrier presenting a nonflammable surface which serves to separate the flammable polymer from oxygen and to insulate the polymer from the high temperature of the fire.

This combination of fire resisting effects is achieved by introducing into the foamable composition (before foam production) previously prepared particles comprising two distinct phases.

The internal phase comprises an inorganic, hydrated salt or oxide or another gas releasing material such as a carbonate or bicarbonate, which, upon exposure to the temperature of the fire, decomposes giving up its water of hydration, carbon dioxide, or other nonflammable gas endothermically. The residue of the internal phase preferably comprises an oxide or silicate which, together with the external phase, serves to form the vitreous barrier layer. The external phase comprises an inorganic oxide or silicate which envelopes, at least partially and preferably completely, the internal phase. The preferred external phase is alkali metal silicate.

In foams containing such additives, upon exposure to fire, as temperature rises, the internal phase absorbs heat and decomposes releasing nonflammable gas explosively while fracturing the external phase. Examples of reactions which occur include:

(1) $Na_2B_2O_7 \cdot 10H_2O \rightarrow Na_2B_2O_7 + 10H_2O \uparrow$
(2) $MH_2BO_3 \cdot XH_2O \rightarrow MH_2BO_3 + XH_2O \uparrow$
(3) $MH_2BO_3 \rightarrow MBO_2 + H_2O \uparrow$
(4) $2MHCO_3 \rightarrow H_2O \uparrow + 2CO_2 \uparrow + M_2O$
(5) $MCO_3 \rightarrow MO + CO_2 \uparrow$
(6) $2Al(OH)_3 \rightarrow Al_2O_3 + 3H_2O \uparrow$
(7) $M_4SiO_4 \cdot XH_2O \rightarrow M_4SiO_4 + XH_2O \uparrow$
(8) $M_2SiO_3 \cdot XH_2O \rightarrow M_2SiO_3 + XH_2O \uparrow$ where M is a monovalent or divalent cation and X is an integer.

Thus, borax, various hydrated borate salts, bicarbonates, carbonates, hydrated oxides, particularly of aluminum such as alumina trihydrate, silicates, metasilicates and orthosilicates, can be useful. The currently preferred material is alumina trihydrate ($Al(OH)_3$ or $Al_2O_3 \cdot 3H_2O$) due to its high proportion of chemically combined water which is stable and unreactive at foam processing temperatures and at the curing temperature of foams.

The external phase may comprise any solid inorganic material which is nonflammable and fuses at high temperature to form a vitreous mass. The fusion temperature of the external phase should be higher than the temperature at which the gas is released by the internal phase. Preferred external phase materials comprise metal oxides and silicates such as sodium silicate ($Na_2SiO_3$).

Generally, the internal phase particle size can vary widely, but preferably is within the range of 0.5–60 micrometers. The external phase coating may vary from less than one to twenty or more micrometers, depending on the energy absorption and explosive force needs.

The particles may take the form of a continuous internal phase having an exterior, totally enveloping coating comprising the external phase. Such classical "microcapsules" offer optimal control of microexplosion magnitude. This type of particle permits the formulator to control the mass of the internal phase and the thickness of the external phase, thereby determining the range of heat absorption necessary to trigger the microexplosion, and exercising a degree of control over the magnitude of the explosion to suit particular applications. It is advantageous in many instances to provide a number of different types of two phase particles, designed to microexplode at different temperatures and magnitudes, to ensure consistent fire retarding effects during the progress of a fire. This can be achieved using external phase materials of varying thickness, tensile strengths, or melting points, and by selecting interior phase materials and particle sizes to regulate the temperature range and magnitude of the microexplosion. For example, fracture will occur at a higher temperature if the gas release temperature of the internal phase is high. Larger internal phase particle size and thicker external phases increase the energy released upon microexplosion.

The fire resistant, two phase particles can also take the form of a random array of discrete internal phase particulate material dispersed within a continuous matrix of external phase. This type of material may be manufactured in bulk and subsequently pulverized to form particles of appropriate size.

The microexplosions occur as heat releases the gas, e.g., water vapor, from the internal phase which, confined within the external phase, builds up pressure, ultimately explosively fracturing the external phase barrier. Accordingly, to achieve the explosive effects, the melting point of the external phase must be higher than the temperature at which the internal phase gas is released.

In view of the foregoing considerations, it will be apparent that the weight ratio of the external to internal phase can vary widely. Excellent results have been obtained using approximately equal masses of the two phases, with the currently preferred particles comprising nineteen parts alumina trihydrate as an internal phase and 21 parts sodium silicate as an external phase. Generally, the external phase should constitute at least about 15%-20% by weight of the two phase particles, but as little as 5% may be used.

The two phase particles may be produced by a variety of known encapsulation techniques including chemical vapor deposition of the external phase onto the particulate internal phase, fluidized bed deposition techniques, and liquid phase deposition techniques. In one successful method, particles of the internal phase are mixed with an aqueous solution of sodium silicate which, upon dehydration, produces a continuous external phase of sodium silicate ($Na_2SiO_3$) containing a dispersed internal phase. The two phase solid is then pulverized to produce particles of appropriate size.

A second type of expandable, fire resistant particulate material useful in the system of the invention is alkali metal silicate comprising retained water. Such particles can be made by casting and partially dehydrating an aqueous solution of a conventional water soluble form of alkali metal silicate, e.g., sodium silicate, and then pulverizing the solid. The silicate may be air dried or oven dried. Furthermore, there are commercially available silicates which already include some retained water and may be used as is. At fire temperatures, the silicate becomes fusible and water in the particles volatilizes and expands the particles to rapidly produce an inorganic silicate foam which ultimately releases water, contributes to the formation of the barrier layer, and has significant fire resistant properties. Inorganic materials which form silicates may be used in place of the alkali silicate component and are considered the equivalent thereof. For example, at fire temperatures, carbonates react with silicon dioxide to yield silicate and carbon dioxide. Thus, fused mixtures of $SiO_2$ and, for example, $Na_2CO_3$, can result in equivalent effects, and the formation of expanded silicate particles. It is often advantageous to include silicate of the type set forth above together with microexplosive particles, or with the internal phase of the microexplosive particles, e.g., with particulate alumina trihydrate.

A highly preferred second type of inorganic material useful in the invention comprises one or more particulate inorganic fire retardant compounds of a class which are known per se. The useful fire retardants preferably contain phosphate groups and one or more ammonium cations. The phosphorous containing compounds are believed to perform their flame retardant function in the condensed phase by increasing the amount of carbonaceous residue or char formed and by redirecting the chemical reactions involved in decomposition in favor of reactions yielding carbon rather than carbon monoxide. Such compounds contribute to the formation of a surface layer of protective char which serves to inhibit access of oxygen and escape of oxides of carbon by physical blockage. Phosphates may act as a flux for the carbonaceous residue. Phosphorous containing compounds are particularly effective in the early decomposition stage of a fire and appear to interfere with gasification which is largely responsible for increased heat transfer and flame propagation. The presence of ammonium in the compound has significant flame retardant action in combination with phosphate. While many known different phosphorous-based fire retardant inorganic materials may be used (see FLAMMABILITY HANDBOOK FOR PLASTICS, third edition, Hilado, page 143, and HANDBOOK OF PLASTICS FLAMMABILITY AND COMBUSTION TOXICOLOGY, A. H. Landrock, chapter 4), the preferred compounds comprise ammonium salts of phosphate, pyrophosphate, tripolyphosphate, or polyphospate, e.g., diammonium phosphate. Ammonium sulfate may also be used.

In polymer based systems when the presence of the ammonium phosphate particulates may interfere with the chemistry of polymerization, curing, or the like, the phosphate fire retardant may be coated or encapsulated using techniques known per se using, for example, melamine, melamine formaldehyde, or another polymeric or inorganic encapsulant. Encapsulation can isolate the retardant from the reactive components of the polymer composition during formation or curing of the material, but the phosphate becomes available when the material is exposed to fire as it is released from the capsules.

The amount of fire retardant included in the foamable composition can vary widely depending on the nature of the foam, the degree of protection required, and the particular retardant employed. Increasing ammonium phosphate content generally result in an increasing degree of flame retardance up to an optimal level, beyond which significant additional increases are not observed. For polyurethane compositions, approximately nine to ten parts ammonium phosphate are included per 100 parts foamable polymer, although the amount may be increased or decreased according to need or preference.

The preferred ratio of fire retardant to fire resistant material (microexplodable particles or hydrated silicate) can also vary widely. Excellent results in polyurethane foams have been obtained using a mixture of about 60 parts ammonium phosphate and about 40 parts fire resistant particles.

The use of a fire retardant of the type described above together with the expandable microexplosive and/or silicate particles achieves interactive effects which complement each other and provide outstanding fire protection. Such foams exceed current national and international fire standards for furniture foams, e.g., U.K. test BS-5852, No. 5 (crib 5 - Furniture Industry Research Association).

The compositions of the invention may be used as an additive for essentially any polymer based composition. Optimal loading and ratios of ingredients may be readily optimized empirically. Useful foamable thermoplastic resins include polyolefins such as polyethylene, polypropylene, and polybutadiene, styrene polymers including ABS resins, polyvinylchlorides, acrylics, polyamides, cellulosics, acetyl polymers, saturated polyesters, polycarbonates, nitriles, chlorinated and sulphonated olefins, vinylidene chloride polymers, polyaryl ethers, and ionomers. Useful thermosetting resins include phenolics, unsaturated polyesters, alkydes, epoxies, amino, and allyl resins. Both rigid and cellular foamed plastics may be treated, including polyisocyanurates, and polyurethanes. The chemistry of formation of the thermosetting and polyurethane cellular foams must be taken into consideration when utilizing these materials to construct a fire resistant foam in accordance with the invention. However, the inorganic additives are essentially chemically inert to the polymer, and the design of specific formulations involves no more skill than is normally required to engineer a foam for a specific application. Extremely successful development work has been conducted with polyurethanes, which have a complex chemistry of formation.

Foams of the invention may be prepared simply by mixing the particulate inorganics uniformly through the foamable composition and then initiating foam polymer formation using conventional methods. In the manufacture of polyurethanes, the inorganics preferably are added to the polyol component prior to introduction of the isocyanate.

Generally, the amount of fire protecting inorganics included in foamable compositions of the invention can vary between 5% to 35% of the total weight of the foamed product. At high loadings, the mechanical properties of the foam may be affected adversely. At low loadings, the degree of fire protection diminishes. In particular cases, the loading selected will represent a balance between the degree of fire protection desired and the mechanical properties required for the foam product in question. Excellent results have been achieved with loading in the range of 15%-22%.

The invention will be further understood from the following non-limiting examples:

EXAMPLE 1

A. 19 parts alumina trihydrate ground to a 10 micrometer particle size are dispersed in a water glass solution containing 21 parts sodium silicate. After oven drying to remove water from the silicate, a solid slab results comprising a continuous external phase of $Na_2SiO_3$ containing a dispersed internal phase of alumina trihydrate. The slab is pulverized and ground to produce particles up to 60 microns in size. 60 parts particulate diammonium phosphate and 10 parts pulverized, oven dried, water soluble sodium silicate particles are then blended with 20 parts of the two phase particles to produce an intimate mixture.

B. 15 parts alumina trihydrate, (10 micrometer particle size) are dispersed in sodium silicate solution containing 25 parts sodium silicate (grade N, The P.Q. Company, Valley Forge, Pa.). After oven drying to remove water from the silicate, a solid slab results comprising a continuous external phase of $Na_2SiO_3$ containing a dispersed internal phase of alumina trihydrate. The slab is pulverized and ground to produce particles on the order of 60 microns in size or smaller. 23 parts of these particles, 53 parts particulate diammonium phosphate, and 24 parts pulverized, oven dried, water soluble sodium silicate particles are then blended together to produce an intimate mixture.

Separately, two batches of a conventional, two part, foamable polyurethane formulation are prepared, which are designed to result in the production of a flexible foam useful for cushioning. The formulation of each batch consisted of the following ingredients in the following parts by weight:

|     | Ingredient | Parts by weight |
| --- | --- | --- |
| (A) | Polyol mixture | |
|     | Pluracol[1] C-133 | 100 |
|     | diethanol amine | 1 |
|     | dibutyl tin dilaurate | 1 |
|     | Silicon[2] | 1.4 |
|     | Dabco 33LV[3] | 0.18 |
|     | Niax Al[4] | 0.4 |
| (B) | Isocyanate | |
|     | toluene diisocyanate | 38.9 |
| (C) | Blowing agent | |
|     | water | 3 |
|     | 1. graft polyol | |
|     | 2. surfactant | |
|     | 3. amine catalyst | |
|     | 4. blowing agent | |

Next, 25.4 parts of the respective A and B filler compositions described above are combined with the polyol mixtures. The isocyanate and blowing agent are then added to the polyol mixtures to initiate foaming.

EXAMPLE 2

The procedure of Example 1 is repeated excepting that 69 parts methylene diisocyanate (isonate 143L) is substituted for the 38.9 parts of toluene diisocyanate, to produce a more rigid polyurethane foam.

EXAMPLE 3

A fire protective additive comprising 4 parts diammonium phosphate, 1.5 parts sodium silicate-encapsulated alumina trihydrate, and 1.5 parts oven dried, water-soluble sodium silicate (dried in air at room temperature for two days) are mixed together and pulverized to produce particles ranging in size up to 60 micrometers. The additive mixture is incorporated into several different types of stock, commercially available foamable compositions at weight percentages varying between 5% and 30% additive.

EXAMPLE 4

A fire protective composition comprising nine parts diammonium phosphate, five parts sodium silicate, and four parts alumina trihydrate is mixed together and pulverized to produce particles ranging in size up to about 60 micrometers. The additive mixture is then incorporated into 85 parts of a polyurethane foam prepolymer mixture.

EXAMPLE 5

A fire protective composition is prepared by blending 9 parts of diammonium phosphate, 5 parts sodium silicate and 4 parts borax encapsulated in sodium silicate. The borax encapsulation is conducted using the same procedure disclosed in example 1 for encapsulating the trihydrate. Particle diameter is up to 60 microns. The additive mixture is then incorporated into 83 parts of a polyurethane foam.

Upon foaming of the foregoing formulations, filled, flexible and rigid polyurethane and other foam polymer batts are produced. Each of the foams are tested by placing the tip of the flame of a propane torch directly in contact with the surface for about two minutes. The flame produces a depression of melted polymer which deepens progressively with time. A slight glow is observed in the area impacted by the flame which disappears when the flame is removed. Smoke generation is minimal. Any flame emanating directly from the foam extinguishes immediately upon removal of the flame. The flame impacted area contains adhered, irregularly shaped blackened particles visible to the naked eye, and a hard, semi-continuous vitreous crust which prevents dripping or flowing of the foam. During the course of the test, no flaming drips are produced. At low additive levels, the fire protecting properties are degraded. At levels above about 30% by weight, the additives increasingly degrade the mechanical properties of the foam.

EXAMPLE 6

A fire protective filler composition is prepared by blending particles of up to about 60 microns in particle size comprising 4 parts diammonium phosphate, 1.5 parts alumina trihydrate encapsulated in sodium silicate as set forth in Example 1, and 2 parts sidium silicate (grade G, the P.Q. Corp.). Twenty parts of this filler composition is mixed with 89 parts of a commercially availabe polyurethane foam prepolymer (Polymer Development Laboratory, Inc., Huntington Beach, CA).

After foaming, the filled material was tested in accordance with the FIRA test BS-5852, part 2 Ignition source 5 (Furniture Industry Research Association, U.K.) The foam exhibited a weight loss of 35 g for the first crib application and 24 g for the second crib application. Consequently, the material satisfies both requirement 3.1.a and 3.2.b of the FIRA Document BS 88/37988DC.

Thus, it will be appreciated that additives and foams of the invention can be manufactured inexpensively using readily available inorganic materials. The fillers can be used to impart fire protection to many different types of polymeric materials, including foam polymers. The relatively low loading of inorganics made possible by the practice of the invention enables production of foams with minimal degradation in mechanical properties. The small amount of smoke generated in the presence of an impacting fire has a composition determined essentially by the nature of the foamed polymer itself, as the additives expel only small amounts of innocuous gases. Foam materials manufactured in accordance with the invention thus very significantly reduce the risk of fire and exposure to toxic gases to people and property when used in place of currently available foams or known types of fire resistant foams in the fabrication of soft furnishings, aircraft seats, and the like.

The invention may be embodied in other specific forms without departing from the spirit and scope thereof, and accordingly, other embodiment are within the following claims.

What is claimed is:

1. A fire protected foamed polymeric material comprising the product of reaction of a mixture of I a foamable polymer composition, II fire resistant inorganic particles, said particles comprising a member selected from the group consisting of:
 (A) inorganic particulate material which, when heated to a preselected temperature above the temperature at which said foamable polymer composition is foamed, endothermically releases a nonflammable gas,
 (B) the particulate material of part A enveloped by a solid, fracturable, inorganic external phase having a fusion point above said preselected temperature, to produce particles comprising at least two phases, said two-phase particulate material, upon exposure to sufficient heat, being microexplodable to release said nonflammable gas, and operable subsequently to form a nonflammable vitreous barrier, and
 (C) mixtures of materials A and B; and III particulate, expandable alkali metal silicate,
said foamed polymeric material being self fire extinguishing, substantially non-dripping, and forming a vitreous surface barrier layer when directly exposed to flame.

2. The material of claim 1 further comprising a member selected from the group consisting of an ammonium salt of phosphate, pyrophosphate, polyphosphate, sulfate and mixtures thereof.

3. The material of claim 1 wherein said foamable polymer composition comprises the reaction product of a polyisocyanate and a polyol in relative proportions sufficient upon foaming to produce a polyurethane foam.

4. The material of claim 3 wherein at least one of said polyisocyanate and said polyol is halogenated.

5. The material of claim 1 wherein said non-flammable gas is $H_2O$, $CO_2$, or a mixture thereof.

6. The material of claim 1 wherein said inorganic particulate material is selected from the group consisting of borax, a hydrated borate salt, a hydrated aluminum oxide, a carbonate, a bicarbonate, and mixtures thereof.

7. The material of claim 1 wherein said inorganic external phase is a material selected from the group consisting of a metal oxide and a silicate.

8. The material of claim 1 wherein said inorganic particulate material comprises alumina trihydrate.

9. The material of claim 1 wherein said inorganic particulate material comprises borax.

10. The material of claim 8 or 9 wherein said external phase comprises alkali metal silicate.

11. The material of claim 1 comprising a plurality of said inorganic, nonflammable gas releasing particulate materials characterized by different preselected temperatures at which said nonflammable gas is released, whereby said microexplodable particles microexplode at differing temperatures upon exposure of said material to fire.

12. The material of claim 1 comprising between 5% and 35% by weight of said inorganic materials and between 65% and 95%, by weight of said foamable polymer composition.

13. A fire protective filler composition for dispersion within a solid polymer phase to impart fire protection thereto, said filler comprising a non aqueous mixture of:
   a component selected from the group consisting of:
   (A) inorganic particulate material which, upon exposure to fire temperatures, endothermically releases a nonflammable gas;
   (B) inorganic particulate material which, upon exposure to fire temperatures, endothermically releases a nonflammable gas enveloped by a solid, fracturable, inorganic external phase having a fusion point above the temperature at which said nonflammable gas is released, and
   (C) mixtures of components A and B,
II particulate, expandable, alkali metal silicate, and
III inorganic fire retardant material selected from the group consisting of an ammonium salt of phosphate, pyrophosphate, polyphosphate, sulfate, and mixtures thereof.

14. The composition of claim 13 wherein said nonflammable gas is $H_2O$ or $CO_2$.

15. The composition of claim 13 wherein said inorganic particulate material is selected from the group consisting of borax, a hydrated borate salt, a hydrated aluminum oxide, a carbonate, a bicarbonate, and mixtures thereof.

16. The composition of claim 13 wherein said inorganic external phase is selected from the group consisting of a metal oxide or a silicate and constitutes more than 15% of the weight of said component B.

17. The composition of claim 13 wherein said inorganic particulate material is alumina trihydrate.

18. The composition of claim 13 or 17 wherein said external phase comprises alkali metal silicate.

19. The composition of claim 13 wherein said inorganic particulate material which releases a nonflammable gas comprises alumina trihydrate.

* * * * *